United States Patent Office 3,251,797
Patented May 17, 1966

3,251,797
PLASTICIZED POLYVINYL CHLORIDE COMPOSITIONS WITH POLYMERS OF SULFUR AND AN UNSATURATED COMPOUND
Chauncey C. De Pugh, Fairless Hills, Pa., and Edward G. Millen, Princeton, N.J., assignors to Thiokol Chemical Corporation, Bristol, Pa., a corporation of Delaware
No Drawing. Filed Apr. 13, 1962, Ser. No. 187,191
16 Claims. (Cl. 260—30.8)

This invention relates to plasticized compositions of homopolymers and copolymers of chloride extended with activated fillers.

The object of the present invention is to provide a novel class of activated filler materials which may be used to either replace a substantial portion of the plasticizer used in preparing plasticized polyvinyl chloride compositions or to extend such compositions.

Polyvinyl chloride is commonly plasticized with about 15 to 75 parts by weight of plasticizer for 100 parts by weight of polymer to increase its flexibility and elastic properties and provide compositions suitable for calendering into thin sheets or films. Among the plasticizers generally used are high boiling liquid esters such as tricresyl phosphate, trioctyl phosphate, di(tridecyl) phthalate, dioctyl phthalate, acetyl styrene, methacrolein, methylvinyl ketone, methyl isopropenyl ketone, vinyl phenyl ketone, tetrabutyl succinate, dipropylene glycol benzoate, tri(2-ethyl hexyl) phosphate, butyl phthalyl butyl glycolate, alkyl aryl phosphates and butyl carbitol adipate.

In addition to plasticizers, stabilizing agents including organo tin compounds such as tin dilaurate, dibutyl tin-S,S'-bis(3,5,5-trimethyl hexyl mercapto acetate) or a mixture of barium and cadmium stearates are usually incorporated with the polymeric ingredients to prevent or inhibit deterioration of the polyvinyl chloride. About 0.5 to 3 parts by weight of these stabilizers are normally used per 100 parts by weight of the polymer.

Small amounts of other additives such as pigments, fillers, colors, lubricants, or mold release agents, e.g., white mineral oil or butyl stearate, may be included in the compositions, but such additives are not required nor may very much of them be used without deleteriously affecting the final product.

Plasticizers are among the most expensive components of these plasticized polyvinyl chloride compositions and the amount needed of these materials to impart the desired properties to the finished product often prices the product out of the competitive market. Many attempts have been made to decrease the cost of plasticized polyvinyl chloride compositions by replacing some of the plasticizer with less expensive materials, such as fillers. Although a great deal of time and effort have been expended in this direction by those in the art, no one, to date, has been able to provide an inexpensive filler material which could be used to replace a substantial portion of the plasticizer needed to attain the desired results without, at the same time, unduly sacrificing the performance characteristics of the final product.

It has now been unexpectedly discovered according to the present invention that activated fillers comprising sulfur and the reaction products of sulfur and ethylenically unsaturated organic compounds having sulfur reactive double bonds can readily be incorporated into plasticized polyvinyl chloride compositions in place of a substantial portion of the plasticizers normally used therein to impart additional elongation properties to the product while at the same time retaining the stress-strain properties desired therein. Where sulfur is used as the activated filler itself or to form the reaction product activated fillers, it may be used in any of the commercially available elementary forms.

According to the present invention, a substantial portion of the plasticizer may be replaced entirely by these activated fillers or the normal stock formulation may be substantially extended therewith. Up to about 25 parts by weight of sulfur or up to about 45 parts by weight of the reaction product activated fillers may be used per 100 parts by weight of the vinyl chloride polymer without imparting any deleterious effect thereto. Therefore, it is preferable to use from about 5 to about 25 parts by weight of sulfur or from about 5 up to about 45 parts by weight of the reaction product activated fillers per 100 parts by weight of the vinyl chloride polymer.

In general, the reaction product activated fillers of the present invention can be prepared by reacting a mixture of sulfur and an ethylenically unsaturated organic compound having at least one reactive double bond such as but not limited to, butadiene, ethyl hexyl acrylate, styrene, vinyl toluene, divinyl benzene, α-methyl styrene, isobutylene, methyl acrylate, acrylonitrile, methyl methacrylate, ethylene, propylene, butene-1, butene-2, isopentene, diisobutylene, triisobutylene, hexene-1, heptene-3, octene-1, dodenene-8, cetene-1, hexyl-2-decene-1, heptadecene-7, pentatriacontene-17, cyclopentene, cyclohexene, pinene, camphene, alloocimene, mycrene, squalene, dihydronaphthalene, indene, acenaphthalene, allene, isoprene, chloroprene, cyclopentadiene, vinyl cyclopentadiene, cyclohexadiene, vinyl cyclohexene, divinyl acetylene, trivinyl benzene, hexatriene, diallyl dimethallyl, 1,6-heptadiene, 1,7-octadiene, 1,8-nonadiene, 1,4-heptadiene, triolefin monovinyl acetylene, ethyl acrylate, acrylic acid, methacrylic acid, vinyl acetate, vinyl chloride, methyl vinyl ketone, diethyl, tetrahydrophthalate, tetrahydrophthalic anhydride, oleic acid, undecylenic acid, crotonic acid, cinnamic acid, croton aldehyde, methyl vinyl ether, in the proportions of approximately 2 to 25 moles of sulfur per mole of ethylenically unsaturated compound at a temperature of 110° C. to 135° C. and preferably about 125° C. for a period of about five to thirty hours. Polymeric addition products are formed under these conditions which, upon cooling at room temperature, and where the sulfur rank of the product is of the order of about 10 or more form friable solids having a high proportion of available sulfur when used as an activated filler. The sulfur rank connotes and may be defined as the number of mols of sulfur reacted per mol of the ethylenically unsaturated compound. The preferred reaction product active fillers are those having a sulfur rank of at least about 10 and the most preferred activated fillers are sulfur and the reaction products of sulfur and styrene or ethyl hexyl acrylate.

In adding the activated filler to the polyvinyl chloride formulations the following procedure may be used: the polyvinyl chloride is mixed with the plasticizer and banded on a hot mill at about 300° F. When the stock has banded, the remainder of the formulation including the activated fillers of the present invention is added slowly. Milling is continued until all ingredients are completely dispersed. For sheeting purposes the stock is rolled out about 15 mils thick, otherwise it is prepared for the press. Sheets may be pressed out 10 minutes at about 300° F. The calendering process may be employed where desired.

In addition to being used with homopolymers of vinyl chloride the activated fillers of the present invention may also be used with copolymers of vinyl chloride and minor amounts of materials such as vinyl acetate.

Fillers, as a rule, are added to polyvinyl chloride compositions to decrease the cost of the formulation. Being comparatively inert, however, they "deaden" the stock and reduce the elongation and flexibility thereof. The "activated fillers" of the present invention, however, not only tend to lower the cost of the stock but also maintain or improve the elongation properties thereof; maintain the tensile strength properties thereof or decrease them to a substantially lesser extent than other fillers known to the art and, where the reaction product activated filler is formed from sulfur and a material such as ethyl hexyl acrylate, substantially improve the resistance to flexing fatigue of the stock treated therewith.

The reaction product activated fillers of the present invention may also be termed plasticized sulfur materials due to the plasticizing action of the unsaturated components on the sulfur in these compositions.

The following examples are merely illustrative of the present invention and are not intended as a limitation upon the scope thereof. In preparing the formulations used in the following examples standard compounding procedures were used.

*Example 1.—Preparation of sulfur/styrene polymer of rank 4*

Thirty-two mols (1024 grams) of sulfur and 8 mols (832 grams) of inhibited styrene were agitated and heated at 120° C. for 6½ hours under a nitrogen atmosphere. The product, after cooling, was a clear, viscous, tacky, nearly odorless, polymer having a sulfur content of about 57% and a molecular weight of about 620. The yields were quantitative.

*Example 2.—Preparation of sulfur/styrene polymer of rank 15*

Fifteen mols (481 grams) of sulfur and 1 mol (104 grams) of inhibited styrene were agitated and heated in a nitrogen-purged atmosphere, maintained at 125° C. for 6½ hours during which time nitrogen was bubbled through the reaction mixture. The resulting composition, after cooling, was a dark viscous polymer having a sulfur content of about 82%. The polymer embrittles after cooling at room temperature for about 70 hours. The yields were quantitative.

*Example 3.—Preparation of sulfur/divinylbenzene polymer of rank 2*

Two mols (64 grams) of sulfur and 1 mol (115 grams) of divinylbenzene were agitated and slowly heated at 120° C. in a nitrogen atmosphere. These conditions were maintained for 4 hours, after which the temperature was raised at 200° C. for ½ hour, then lowered to 120° C. for the remainder of a total reaction period of 10 hours. No revertion odor was perceptible at the elevated temperature. The resulting composition, after cooling, was a tough plastic-like polymer having a sulfur content of about 39% and a molecular weight of about 865. The yields were quantitative.

*Example 4.—Preparation of sulfur/vinyltoluene polymer of rank 4*

Four moles (128 grams) of sulfur and 1 mol (118 grams) of vinyltoluene were agitated and slowly heated at 120° C. for 10 hours in a nitrogen atmosphere. The resulting product, after cooling, was a dark viscous putty-like polymer having a sulfur content of about 53% and a molecular weight of about 480. The yields were quantitative.

*Example 5.—Preparation of sulfur/alpha-methylstyrene polymer of rank 4*

Four mols (128 grams) of sulfur and 1 mol (118.2 grams) of alpha-methylstyrene were agitated and slowly heated at 120° C. for 10 hours in a nitrogen atmosphere. After cooling, the unfiltered reaction product yielded 187 grams of viscous polymer having as sulfur content of about 64% and a molecular weight of about 250. Filtering this polymer yielded 58 grams of unreacted sulfur.

*Example 6.—Preparation of sulfur/ethylhexyl acrylate of rank 15*

Fifteen mols (481 grams) of sulfur and one mol (184 grams) of 2-ethylhexyl acrylate were agitated and heated at 125–135° C. for 6–10 hours. The product, after cooling, was a yellow crystalline material having a sulfur content of about 73.7%. The yields were quantitative.

*Example 7.—Concentration effect of activated filler on plasticized polyvinyl chloride*

To determine the effective concentration range of sulfur and styrene/sulfur (rank 15), various proportions of each ranging from 5 to 45 phr. were milled into a homopolymeric polyvinyl chloride composition containing 35 parts of dioctyl phthalate. A slight improvement was noted at 5 phr. concentration but a practical use minimum of 15 phr. with a maximum of 35 phr. would be indicated based on considerations of stress-strain properties, bloom and economics.

The formulations used and results obtained are shown below.

Base formulation: Parts by weight
- Polyvinyl chloride _____ 100
- Dioctyl phthalate _____ 35
- Advastab T 150 [1] _____ 2
- Activated plasticizer _____ As shown below

FORMULATION VARIATIONS

|  | 1 | 2 | 3 | 4 | 5 | 6 | 7 | 8 | 9 | 10 | 11 | 12 | 13 |
|---|---|---|---|---|---|---|---|---|---|---|---|---|---|
| Sulfur |  | 5 | 12.5 | 20 | 25 | 35 | 45 |  |  |  |  |  |  |
| Styrene/sulfur (rank 15) (prepared as in Example 2) |  |  |  |  |  |  |  | 5 | 12.5 | 20 | 25 | 35 | 45 |

PHYSICAL PROPERTIES—PRESSED OUT 10 MINUTES AT 300° F.

|  | 1 | 2 | 3 | 4 | 5 | 6 | 7 | 8 | 9 | 10 | 11 | 12 | 13 |
|---|---|---|---|---|---|---|---|---|---|---|---|---|---|
| Modulus, 100% |  | 2,300 | 2,500 | 2,325 | 2,250 | 2,150 | 1,870 | 1,700 | 2,040 | 2,620 | 1,690 | 2,050 | 1,800 | 1,610 |
| Tensile, p.s.i. |  | 3,070 | 2,930 | 2,465 | 2,820 | 3,000 | 2,275 | 1,700 | 3,085 | 3,195 | 3,100 | 3,075 | 2,455 | 1,760 |
| Elongation, percent |  | 160 | 180 | 180 | 270 | 290 | 190 | 100 | 200 | 210 | 250 | 310 | 210 | 110 |
| "A" Hardness |  | 96 | 95 | 94 | 83 | 95 | 95 | 96 | 97 | 94 | 95 | 95 | 94 | 92 |
| Tear, p.i. |  | 650 | 586 | 568 | 593 | 550 | 490 | 380 | 628 | 533 | 539 | 520 | 500 | 340 |

[1] Organo tin stabilizer (Advance Solvents Chemical Co., Division of Carlisle Chemical Works, Inc.).

*Example 8.—Effectiveness of sulfur as an activated filler in homopolymeric polyvinyl chloride compositions plasticized with various plasticizers*

In order to determine the compatibility of sulfur with various types of plasticizers, a random selection of various types was made including dioctyl phthalate, representing somewhat of a cross-section of the commercially available materials used or plasticizers in polyvinyl chloride compositions. It was found that the sulfur additive was compatible with all the plasticizers. The compositions used and physical properties obtained therewith are shown below.

PARTS BY WEIGHT

| | | | | | | | | | | | | | | | | |
|---|---|---|---|---|---|---|---|---|---|---|---|---|---|---|---|---|
| Polyvinyl chloride | 100 | 100 | 100 | 100 | 100 | 100 | 100 | 100 | 100 | 100 | 100 | 100 | 100 | 100 | 100 | 100 |
| Advastab T 150 | 2 | 2 | 2 | 2 | 2 | 2 | 2 | 2 | 2 | 2 | 2 | 2 | 2 | 2 | 2 | 2 |
| Sulfur | 25 | | 25 | | 25 | | 25 | | 25 | | 25 | | 25 | | 25 | |
| Dioctyl phthalate | 35 | 35 | | | | | | | | | | | | | | |
| Tetrabutyl succinate | | | 35 | 35 | | | | | | | | | | | | |
| Dipropylene glycol benzoate | | | | | 35 | 35 | | | | | | | | | | |
| Tri(2-ethyl hexyl) phosphate | | | | | | | 35 | 35 | | | | | | | | |
| Butyl phthalyl butyl glycolate | | | | | | | | | 35 | 35 | | | | | | |
| Alkyd aryl phosphate | | | | | | | | | | | 35 | 35 | | | | |
| Tricresyl phosphate | | | | | | | | | | | | | 35 | 35 | | |
| Butyl carbitol adipate | | | | | | | | | | | | | | | 35 | 35 |

PHYSICAL PROPERTIES—PRESSED OUT 10 MINUTES AT 300° F.

| | | | | | | | | | | | | | | | | |
|---|---|---|---|---|---|---|---|---|---|---|---|---|---|---|---|---|
| Modulus, 100% | 2,100 | 2,320 | 2,180 | 2,250 | 2,550 | 2,500 | 1,700 | 1,900 | 1,750 | 2,100 | 2,120 | 2,650 | 2,800 | 3,420 | 1,900 | 2,350 |
| Tensile, p.s.i. | 2,960 | 3,160 | 3,065 | 3,480 | 3,025 | 2,895 | 2,495 | 2,370 | 2,250 | 3,330 | 2,515 | 3,617 | 3,175 | 3,720 | 2,830 | 3,300 |
| Elongation, percent | 310 | 180 | 300 | 210 | 220 | 150 | 270 | 120 | 180 | 200 | 210 | 180 | 250 | 200 | 220 | 200 |
| "A" Hardness | 94 | 96 | 95 | 96 | 95 | 98 | 96 | 95 | 95 | 96 | 96 | 98 | 98 | 99 | 91 | 92 |
| Tear, p.i. | 536 | 450 | 567 | 413 | 685 | 515 | 492 | 372 | 549 | 408 | 617 | 535 | 840 | 983 | 450 | 480 |

*Example 9.—Effect of increased activated filler concentrations in polyvinyl chloride compositions plasticized with dioctyl phthalate plasticizer*

To further determine effective concentration ranges of the activated fillers of the present invention, various proportions of them, ranging from 25 to 55 parts by weight per 100 parts by weight of vinyl chloride polymer were milled into a polyvinyl chloride composition containing 60 parts by weight of dioctyl phthalate. Where styrene/sulfur of rank 15 was used as the activated filler, up to and including 35 to 45 parts by weight were effective and 25 parts by weight of sulfur, itself, were effective without deleteriously affecting the product based on considerations of stress-strain properties and economics.

Base formulation: Parts by weight
    Polyvinyl chloride _____ 100
    Dioctyl phthalate _____ 60
    Advastab T 150 _____ 2
    Activated filler _____ As shown below

FORMULATION

| | 1 | 2 | 3 | 4 | 5 |
|---|---|---|---|---|---|
| Polyvinyl chloride | 100 | 100 | 100 | 100 | 100 |
| Dioctyl phthalate | 35 | 35 | 35 | 60 | 35 |
| Advastab T 150 | 2 | 2 | 2 | 2 | 2 |
| Sulfur | 25 | | | | |
| Ethyl hexyl acrylate/sulfur (rank 15) (as prepared in Example 6) | | 25 | | | |
| Styrene/sulfur (rank 15) (as prepared in Example 2) | | | | | 25 |

PHYSICAL PROPERTIES—PRESSED OUT 10 MINUTES AT 300° F.

| | | | | | |
|---|---|---|---|---|---|
| Modulus, 100% | 2,030 | 1,600 | 2,320 | 1,080 | 1,950 |
| Modulus, 200% | 2,500 | 2,200 | | | |
| Tensile, p.s.i. | 2,750 | 2,615 | 3,160 | 2,100 | 3,125 |
| Elongation, percent | 280 | 300 | 180 | 280 | 300 |
| "A" Hardness | 95 | 91 | 96 | 79 | 92 |
| Tear, p.i. | 582 | 467 | 450 | 308 | 500 |

FORMULATION VARIATIONS

| | 1 | 2 | 3 | 4 | 5 | 6 | 7 | 8 | 9 |
|---|---|---|---|---|---|---|---|---|---|
| Syrene/sulfur (rank 15) (as prepared in example 2 | | 25 | | 35 | | 45 | | 55 | |
| Sulfur | | | 25 | | 35 | | 45 | | 55 |

PHYSICAL PROPERTIES—PRESSED OUT 10 MINUTES AT 300° F.

| | 1 | 2 | 3 | 4 | 5 | 6 | 7 | 8 | 9 |
|---|---|---|---|---|---|---|---|---|---|
| Modulus, 100% | 1,160 | 920 | 950 | 850 | 860 | 800 | 750 | 700 | 800 |
| Modulus, 200% | 1,800 | 1,440 | 1,460 | 1,280 | 1,350 | 1,250 | | 1,075 | |
| Modulus, 300% | | 1,850 | | 1,720 | | 1,640 | | | |
| Tensile, p.s.i. | 2,230 | 2,230 | 1,930 | 1,900 | 1,760 | 1,835 | 1,060 | 1,170 | 930 |
| Elongation, percent | 290 | 400 | 290 | 350 | 230 | 360 | 190 | 210 | 130 |
| Tear, p.i. | 321 | 297 | 314 | 280 | 308 | 274 | 278 | 239 | 237 |
| Hardness, Shore A | 80 | 75 | 77 | 74 | 75 | 73 | 72 | 74 | 81 |

*Example 10.—Reaction product activated fillers in plasticized homopolymeric polyvinyl chloride compositions*

This example illustrates another unexpected facet of the present invention in that whereas the addition of solid adjuvants to polyvinyl chloride compositions normally results in a reduction in the elongation properties of the finished products the addition of solid activated fillers according to the present invention results in a retention or increase in the elongation properties of the product. The formulations used and the properties obtained after the milling thereof are shown below.

*Example 11.—Effect of activated filler of present invention versus a standard filler in homopolymeric polyvinyl chloride compositions*

A comparison was made, in this example, between the effect obtained on the elongation properties of products made from plasticized polyvinyl chloride compositions comprising, in part, activated fillers of the present invention and a standard filler used in the art, calcium carbonate. Whereas the use of the standard filler resulted in a substantial loss in elongation properties, the use of the activated fillers of the present invention resulted in substantial increases in elongation values. The formulations used and the properties obtained on the finished product are shown below.

|  | 1 | 2 | 3 | 4 |
|---|---|---|---|---|
| Polyvinyl chloride | 100 | 100 | 100 | 100 |
| Butyl carbitol adipate | 35 | 35 | 35 | 35 |
| Advastab T 150 | 2 | 2 | 2 | 2 |
| Styrene/sulfur (rank 15) (as prepared in Example 2) |  | 25 |  |  |
| Sulfur |  |  | 25 |  |
| Calcium carbonate (filler) |  |  |  | 25 |

*Example 13.—Effect of sulfur and styrene/sulfur (rank 15) on plasticized vinyl chloride/vinyl acetate copolymer compositions*

This example illustrates the compatibility of the activated fillers of the present invention with copolymers of vinyl chloride and the fact that plasticized polyvinyl chloride compositions made with such copolymers can be substantially extended with the activated fillers of the present invention without, on the average, unduly lowering the physical property values of the resulting products. The formulations used and physical properties of the products obtained therewith are shown below.

FORMULATIONS

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Dioctyl phthalate | 35 | 35 | 35 | 35 | 35 | 35 | 35 | 35 | 35 | 35 | 35 | 35 | 35 | 35 | 35 |
| Advastab T 150 | 2 | 2 | 2 | 2 | 2 | 2 | 2 | 2 | 2 | 2 | 2 | 2 | 2 | 2 | 2 |
| Vinyl chloride/vinyl acetate copolymer (97/3) | 100 | 100 | 100 |  |  |  |  |  |  |  |  |  |  |  |  |
| Vinyl chloride/vinyl acetate copolymer (91/9) |  |  |  | 100 | 100 | 100 |  |  |  |  |  |  |  |  |  |
| Vinyl chloride/vinyl acetate copolymer (90/10) |  |  |  |  |  |  | 100 | 100 | 100 |  |  |  |  |  |  |
| Vinyl chloride/vinyl acetate copolymer (86/13) |  |  |  |  |  |  |  |  |  | 100 | 100 | 100 |  |  |  |
| Vinyl chloride/vinyl acetate copolymer (85/15) |  |  |  |  |  |  |  |  |  |  |  |  | 100 | 100 | 100 |
| Sulfur |  | 25 |  |  | 25 |  |  | 25 |  |  | 25 |  |  | 25 |  |
| Styrene/sulfur (rank 15) (as prepared in Example 2) |  |  | 25 |  |  | 25 |  |  | 25 |  |  | 25 |  |  | 25 |

PHYSICAL PROPERTIES—PRESSED OUT 10 MINUTES AT 300° F

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Modulus, 100% | 1,800 | 1,700 | 1,400 | 1,350 | 1,400 | 1,100 | 1,900 | 1,650 | 1,850 | 2,700 | 2,300 | 2,100 | 1,700 | 1,600 | 1,200 |
| Tensile, p.s.i | 2,095 | 1,875 | 1,770 | 1,980 | 1,590 | 1,535 | 2,915 | 2,470 | 2,645 | 3,360 | 2,670 | 3,112 | 2,185 | 1,715 | 1,575 |
| Elongation, percent | 150 | 110 | 160 | 180 | 175 | 170 | 200 | 210 | 170 | 200 | 140 | 220 | 170 | 120 | 150 |
| Hardness, Shore A | 94 | 95 | 92 | 94 | 94 | 90 | 95 | 95 | 90 | 96 | 95 | 95 | 97 | 97 | 95 |
| Tear, p.i | 387 | 383 | 292 | 334 | 339 | 178 | 340 | 322 | 263 | 423 | 600 | 536 | 398 | 407 | 269 |

PROPERTIES—PRESSED OUT 10 MINUTES, 300° F.

|  | 1 | 2 | 3 | 4 |
|---|---|---|---|---|
| Modulus, 100% | 2,350 | 1,850 | 1,900 |  |
| Tensile, p.s.i | 3,300 | 2,985 | 2,830 | 2,290 |
| Elongation, percent | 200 | 220 | 220 | 90 |
| Hardness, Shore A | 92 | 90 | 91 | 95 |
| Tear, p.i | 480 | 443 | 450 | 386 |

*Example 12.—Effects of filler addition and reduction of dioctyl phthalate plasticizer in homopolymeric polyvinyl chloride compositions*

This example further indicates the advantages of using the activated fillers of the present invention in comparison with the use of standard filler materials to either extend plasticized polyvinyl compositions therewith or to replace in part, the quantity of plasticizer normally used therein in order to improve both the economic and elongation characteristics of the resulting products. The products made with the activated fillers of the present invention had improved elongation properties whereas those made with a standard filler had reduced elongation properties. The formulations used and resulting properties of the products are shown below.

|  | 1 | 2 | 3 | 4 | 5 | 6 |
|---|---|---|---|---|---|---|
| Polyvinyl chloride | 100 | 100 | 100 | 100 | 100 | 100 |
| Dioctyl phthalate | 60 | 60 | 60 | 35 | 35 | 35 |
| Stanclere 80 [1] | 2 | 2 | 2 | 2 | 2 | 2 |
| Styrene/sulfur (rank 15) (prepared as in Example 2) |  | 25 |  | 25 |  |  |
| Sulfur |  |  |  |  |  | 25 |
| Calcium carbonate |  |  | 25 |  | 25 |  |

PHYSICAL PROPERTIES—PRESSED OUT 10 MINUTES AT 300° F.

|  | 1 | 2 | 3 | 4 | 5 | 6 |
|---|---|---|---|---|---|---|
| Modulus, 100% | 1,080 | 850 | 1,300 | 1,950 | 2,840 | 2,070 |
| Modulus, 300% |  | 1,800 |  | 3,095 |  | 3,000 |
| Tensile, p.s.i | 2,100 | 2,290 | 2,110 | 3,125 | 3,205 | 3,070 |
| Elongation, percent | 280 | 400 | 220 | 300 | 205 | 300 |
| Hardness, Shore A | 79 | 75 | 84 | 92 | 97 | 95 |
| Tear, p.i | 308 | 274 | 304 | 500 | 538 | 544 |

[1] Organo tin stabilizer (Gallard-Schlesinger Chemical Mfg. Corp.).

*Example 14*

This example illustrates the use of sulfur, styrene/sulfur (rank 15) and ethyl hexyl acrylate/sulfur (rank 15) in a commercial, plasticized, homopolymeric polyvinyl chloride cable 60° C. formulation to produce a more economical product while maintaining or enhancing the physical properties thereof. The formulations used and the properties of the products obtained are as follows:

FORMULATIONS

|  | 1 | 2 | 3 | 4 |
|---|---|---|---|---|
| Polyvinyl chloride | 100 | 100 | 100 | 100 |
| Burgess pigment #20 [1] | 20 | 20 | 20 | 10 |
| Calcium carbonate | 30 | 30 | 30 | 20 |
| Lead silicate sulfate (stabilizer) | 5 | 5 | 5 | 5 |
| Dioctyl phthalate | 62 | 37 | 37 | 37 |
| Stearic acid (lubricant) | 0.26 | 0.26 | 0.26 | 0.26 |
| Sulfur |  |  |  | 20 |
| Styrene/sulfur (rank 15) (as prepared in Example 2) |  | 25 |  |  |
| Ethyl hexyl acrylate/sulfur (rank 15) (as prepared in Example 6) |  |  | 25 | 25 |

PHYSICAL PROPERTIES—PRESSED OUT 10 MINUTES AT 300° F.

|  | 1 | 2 | 3 | 4 |
|---|---|---|---|---|
| Modulus, 100% | 1,500 | 2,190 | 1,950 | 1,600 |
| Modulus, 200% | 2,000 | 2,500 | 2,350 | 2,020 |
| Tensile | 2,180 | 2,605 | 2,600 | 2,340 |
| Elongation, percent | 270 | 220 | 290 | 270 |
| V-Tear | 330 | 520 | 490 | 440 |
| Duro "A" | 86 | 95 | 95 | 91 |
| Duro "D" | 35 | 55 | 51 | 45 |

[1] Cream white pigment (composition of titanium dioxide, alumina & silica)—Burgess Pigment Company.

*Example 15*

The example illustrates the use of sulfur, styrene/sulfur (rank 15) and ethyl hexyl acrylate/sulfur (rank 15) in polyvinyl chloride commercial cable 90° C. formulations to produce more economical products while maintaining or enhancing the physical properties thereof.

The formulations used and the properties of the products obtained are as follows:

FORMULATIONS

|  | 1 | 2 | 3 | 4 | 5 | 6 |
|---|---|---|---|---|---|---|
| Polyvinyl chloride | 100 | 100 | 100 | 100 | 100 | 100 |
| Burgess pigment #20 | 15 | 15 | 15 | 10 | 15 | 10 |
| Dibasic lead phthalate (stabilized) | 7 | 7 | 7 | 7 | 7 | 7 |
| Calcium carbonate | 13 | 13 | 13 | 8 | 13 | 8 |
| Ditridecyl phthalate | 50 | 30 | 30 | 30 | 30 | 30 |
| Stearic acid (lubricant) | 0.26 | 0.26 | 0.26 | 0.26 | 0.26 | 0.26 |
| Sulfur | | 20 | | 10 | | 10 |
| Styrene/sulfur (rank 15) (as prepared in Example 2) | | | 20 | 20 | | |
| Ethyl hexyl acrylate/sulfur (rank 15) (as prepared in Example 6) | | | | | 20 | 20 |

PHYSICAL PROPERTIES—PRESSED OUT 10 MINUTES AT 300° F.

| | | | | | | |
|---|---|---|---|---|---|---|
| Modulus, 100% | 2,000 | 2,780 | 2,950 | 2,600 | 2,600 | 2,450 |
| Modulus, 200% | 2,340 | | 3,085 | | 2,890 | 2,740 |
| Tensile | 2,335 | 2,895 | 3,100 | 2,740 | 2,980 | 2,895 |
| Elongation, percent | 200 | 180 | 200 | 190 | 220 | 270 |
| V-tear | 425 | 690 | 710 | 535 | 640 | 600 |
| Duro "A" | 96 | 98 | 99 | 97 | 98 | 98 |
| Duro "D" | 54 | 68 | 66 | 62 | 63 | 60 |

*Example 16*

The following example illustrates the effect on the flexing properties of plasticized polyvinyl chloride in which there is admixed the activated fillers of the present invention. A comparison was made in the flexing properties of products made with both the activated fillers of the present invention and a standard filler, calcium carbonate.

The test specimens were pressed out in 15 minutes at 300° F. The data obtained in these tests using a Ross Flexometer indicates that the use of the activated fillers of the present invention substantially increases the flexing properties of the products made therewith.

The formulations used and the results obtained are as follows.

Cut growth is measured in tenths of an inch. The flex strips are punched in the center at the flex point. This puncture measures 0.1 inch. When the crack increases to 0.2 inch, this is called 100% cut growth. At 900%, the strip is cracked its full width. At 1000%, the crack has obtained some depth. The test strips are removed from the test device at this point.

Any strip that has less than 500% cut growth at 50,000 flexes is considered good in a shoe sole stock.

FORMULATIONS

|  | 1 | 2 | 3 | 4 | 5 |
|---|---|---|---|---|---|
| Polyvinyl chloride | 100 | 100 | 100 | 100 | 100 |
| Dioctyl phthalate | 35 | 35 | 35 | 35 | 35 |
| Advastab T 150 | 2 | 2 | 2 | 2 | 2 |
| Styrene/sulfur (rank 15) (prepared as in Example 2) | | 25 | | | |
| Sulfur | | | 25 | | |
| Witcarb RC (CaCO₃) | | | | 25 | |
| Ethyl hexyl acrylate/sulfur (rank 15) (prepared as in Example 6) | | | | | 25 |

FLEX RESISTANCE (ROSS FLEXOMETER)

| | Percent cut growth | | | | |
|---|---|---|---|---|---|
| No. of Flexes: | | | | | |
| 100 | 400 | 50 | | 300 | |
| 300 | 450 | | | | |
| 500 | 500 | 150 | | 400 | |
| 1,000 | 650 | 150 | 75 | 700 | |
| 2,000 | 950 | | | | |
| 3,000 | 1,000 | 200 | 150 | 1,000 | |
| 5,000 | | 200 | 200 | | 50 |
| 8,000 | | | | | |
| 10,000 | | 250 | 300 | | 150 |
| 20,000 | | 300 | 1,000 | | 175 |
| 50,000 | | 500 | | | 250 |
| 100,000 | | 1,000 | | | 300 |

Results similar to those shown in Examples 10 to 16 can also be obtained with the other activated fillers described above and/or prepared in several of the other examples, but not specifically evaluated in the examples disclosed herein.

We claim:

1. A vinyl chloride resin composition comprising a vinyl chloride polymer and at least one activated filler which is the polymeric reaction product of sulfur and an ethylenically unsaturated organic compound said filler being present in said composition to the extent of from approximately 5 parts by weight up to approximately 55 parts by weight per 100 parts by weight of said vinyl chloride polymer.

2. A composition as in claim 1 in which said ethylenically unsaturated organic compound is selected from the group consisting of butadiene, ethyl hexyl acrylate, styrene, vinyl toluene, divinyl benzene, α-methyl styrene, isobutylene, methyl acrylate, acrylonitrile, methylmethacrylate, ethylene, propylene, butene-1, butene-2, isopentene, diisobutylene, triisobutylene, hexene-1, heptene-3, octene-1, dodenene-8, cetene-1, hexyl-2-decene-1, heptadecene-7, pentatriacontene-17, cyclopentene, cyclohexene, pinene, camphene, alloocimene, myrcene, squalene, dihydronaphthalene, indene, acenaphthalene, allene, isoprene, chloroprene, cyclopentadiene, vinyl cyclopentadiene, cyclohexadiene, vinyl cyclohexene, divinyl acetylene, trivinyl benzene, hexatriene, diallyl dimethallyl, 1,6-heptadiene, 1,7-octadiene, 1,8-nonadiene, 1,4-heptadiene, triolefin monovinyl acetylene, ethyl acrylate, acrylic acid, methacrylic acid, vinyl acetate, vinyl chloride, methyl vinyl ketone, diethyl tetrahydrophthalate, tetrahydrophthalic anhydride, oleic acid, undecylenic acid, crotonic acid, cinnamic acid, croton aldehyde and methyl vinyl ether.

3. A composition as in claim 2 in which said vinyl chloride polymer is a homopolymer.

4. A composition as in claim 2 in which said vinyl chloride polymer is a copolymer.

5. A composition as in claim 4 in which said copolymer is a copolymer of vinyl chloride and vinyl acetate.

6. A composition as in claim 2 in which said polymeric reaction product is a solid material at room temperature.

7. A composition as in claim 6 in which said polymeric reaction product has a sulfur rank of at least 10.

8. A composition as in claim 6 in which said ethylenically unsaturated organic compound is styrene.

9. A composition as in claim 6 in which said ethylenically unsaturated organic compound is ethyl hexyl acrylate.

10. A plasticized vinyl chloride resin composition comprising a vinyl chloride polymer and at least one activated filler which is a solid polymeric reaction product of sulfur and an ethylenically unsaturated organic compound, said filler being present in said composition to the extent of from approximately 5 parts by weight up to approximately 45 parts by weight per 100 parts by weight of said vinyl chloride polymer.

11. A composition as in claim 10 in which said ethylenically unsaturated organic compound is styrene.

12. A composition as in claim 10 in which said ethylenically unsaturated organic compound is ethyl hexyl acrylate.

13. A plasticized vinyl chloride composition comprising a vinyl chloride polymer, sulfur and at least one activated filler which is a solid reaction product of sulfur and an ethylenically unsaturated organic compound said sulfur and said activated filler, being present in said composition in amounts of from approximately 5 parts by weight up to approximately 45 parts by weight per 100 parts by weight of said vinyl chloride polymer.

14. A composition as in claim 13 in which said ethylenically unsaturated organic compound is selected from the group consisting of butadiene, ethyl hexyl acrylate, styrene, vinyl toluene, divinyl benzene, α-methyl styrene, isobutylene, methyl acrylate, acrylonitrile, methyl methacrylate, ethylene, propylene, butene-1, butene-2, isopentene, diisobutylene, triisobutylene, hexene-1, heptene-3, octene-1, dodenene-8, cetene-1, hexyl-2-decene-1, heptadecene-7, pentatriacontene-17, cyclopentene, cyclohexene, pinene, camphene, alloocimene, myrcene, squalene, dihydronaphthalene, indene, acenaphthalene, allene, isoprene, chloroprene, cyclopentadiene, vinyl cyclopentadiene, cyclohexadiene, vinyl cyclohexene, divinyl acetylene, trivinyl benzene, hexatriene, diallyl dimethallyl, 1,6-heptadiene, 1,7-octadiene, 1,8-nonadiene, 1,4-heptadiene, triolefin monovinyl acetylene, ethyl acrylate, acrylic acid, methacrylic acid, vinyl acetate, vinyl chloride, methyl vinyl ketone, diethyl tetrahydrophthalate, tetrahydrophthalic anhydride, oletic acid, undecylenic acid, crotonic acid, cinnamic acid, croton aldehyde and methyl vinyl ether.

15. A composition as in claim 14 in which said ethylenically unsaturated organic compound is styrene.

16. A composition as in claim 14 in which said ethylenically unsaturated organic compound is ethyl hexyl acrylate.

References Cited by the Examiner
UNITED STATES PATENTS

| | | | |
|---|---|---|---|
| 2,175,049 | 10/1939 | Alexander | 260—79.5 |
| 2,222,928 | 11/1940 | Alexander | 260—30.8 |
| 2,227,311 | 12/1940 | Kipper | 260—79 |
| 2,447,004 | 8/1948 | Gamson | 260—79 |
| 2,720,509 | 10/1955 | Cushing | 260—79 |
| 2,738,344 | 3/1956 | Rogers et al. | 260—139 |

ALEXANDER H. BRODMERKEL, *Primary Examiner.*

LESLIE H. GASTON, MORRIS LIEBMAN, *Examiners.*

A. O. DENT, L. T. JACOBS, *Assistant Examiners.*